UNITED STATES PATENT OFFICE.

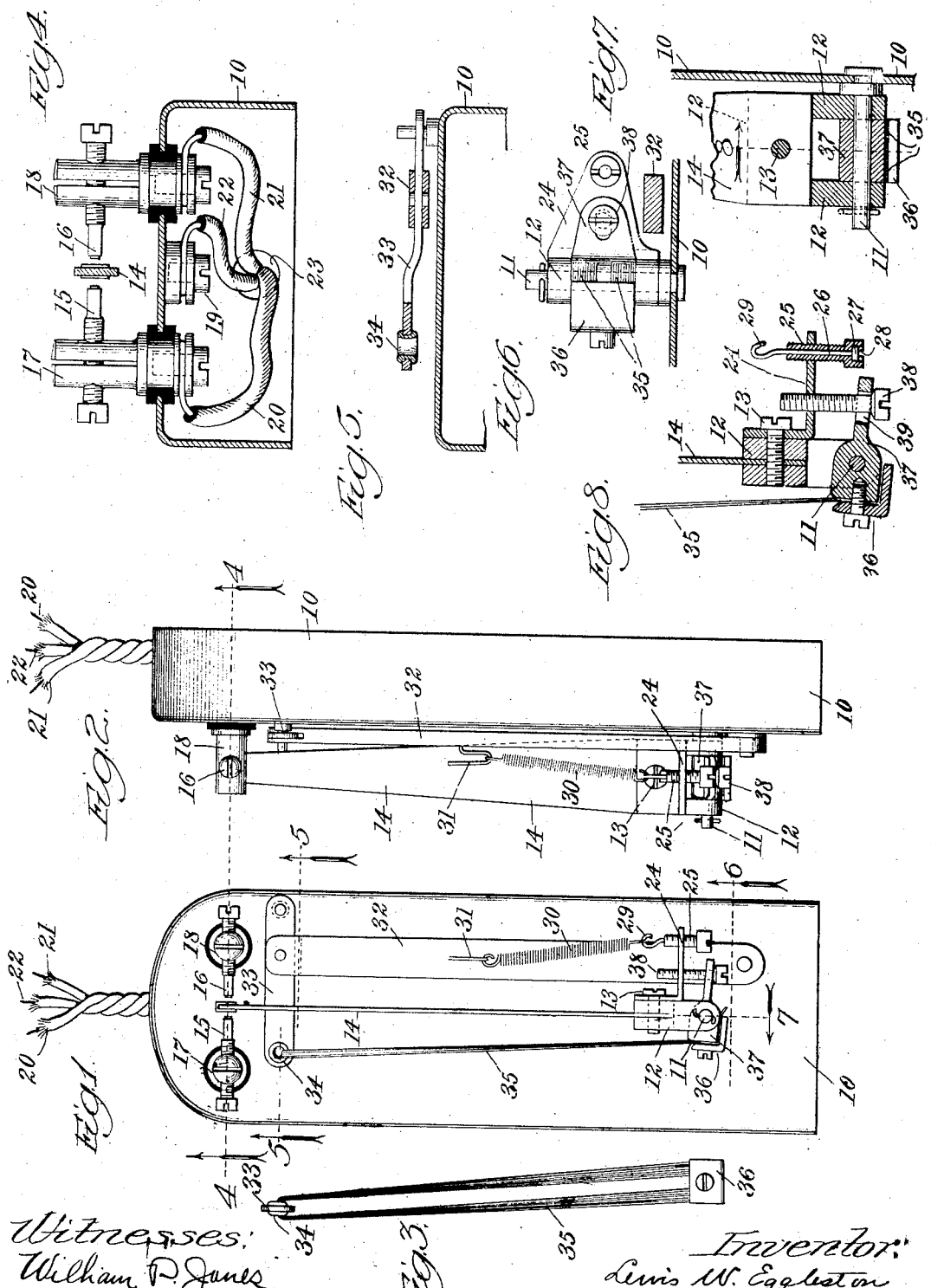

LEWIS W. EGGLESTON, OF BUFFALO, NEW YORK, ASSIGNOR TO AMERICAN RADIATOR COMPANY OF CHICAGO, ILLINOIS, A CORPORATION OF NEW JERSEY.

HYGROSTAT.

1,319,055.　　　　　Specification of Letters Patent.　　Patented Oct. 21, 1919.

Application filed April 15, 1918. Serial No. 228,596.

*To all whom it may concern:*

Be it known that I, LEWIS W. EGGLESTON, a citizen of the United States, residing at Buffalo, Erie county, in the State of New York, have invented certain new and useful Improvements in Hygrostats, of which the following is a full, clear, and exact specification.

This invention relates to improvements in hygrostats, and has for its object to provide a device of this character which is simple in construction and which is quickly responsive to slight variations in the humidity of the air within the compartment in which it is installed.

Further, the invention has for its object to provide a device of this character, the operation of which will not be affected by changes in the temperature of the surrounding air.

Further, the invention has for its object to provide a device of this character adapted to control the electric circuits of an electromagnetically operated device, located at any desired place, and controlling the admission of moisture from a humidifier into the compartment.

Further, the invention has for its object to provide a device of this character which may be readily adjusted to adapt it to maintain the air in the compartment at any desired degree of humidity.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawing showing an illustrative embodiment of the invention—

Figure 1 is a front view of a hygrostat constructed according to, and embodying the invention;

Fig. 2 is a side elevational view thereof;

Fig. 3 is a detail view of the controlling means which is responsive to the humidity of the compartment;

Fig. 4 is a sectional view taken on the line 4—4 of Figs. 1 and 2;

Fig. 5 is a sectional view taken substantially on the line 5—5 of Fig. 1;

Fig. 6 is a sectional view taken substantially on the line 6—6 of Fig. 1;

Fig. 7 is a sectional view taken substantially on the line 7—7 of Fig. 1, and

Fig. 8 is a sectional view taken substantially on the line 8—8 of Fig. 7.

In order to maintain the humidity of the air in a heated compartment at a predetermined, desired degree, it is the practice to provide a humidifying device to supply moisture to the compartment as the humidity of the air therein decreases owing to the heating thereof. The admission of moisture from the humidifying device into the compartment is ordinarily controlled by a valve or the like, the opening and closing of which is, in turn, controlled by a hygrostat installed within the compartment and responsive to variations in the humidity of the air therein. It is customary to operate the valve by means of an electrically-operated mechanism, in which case the hygrostat is adapted to control electric circuits, the closing of which will cause the electrically-operated mechanism to open or close the valve. While the hygrostat forming the subject matter of this invention is primarily intended for use in systems of the above described type, it is of course understood that it is adapted for use in any system in which the operation of any device is to be controlled by an instrument responsive to variations in the humidity of the air surrounding the same.

Referring to the drawing, the hygrostat is shown as comprising a hollow metal base 10, having supported thereon, adjacent its lower end, a pivot-pin 11. Oscillatingly supported upon the pivot-pin 11 is a contact arm having a yoke-shaped end portion 12 to which is secured, as by a screw 13, one end of a metal bar 14. The free end of the bar 14 plays between two contact members 15, 16, carried by binding posts 17, 18 mounted upon and insulated from the base 10, adjacent the upper end thereof. Secured to the inner wall of the base 10 is a binding post 19 which is in electrical connection with the bar 14 of the contact arm through the base 10, the pivot-pin 11, and the yoke-shaped end portion 12 of the arm. Electrical conductors 20, 21 and 22, connected to the binding posts 17, 18 and 19 respectively, pass through an opening 23 formed in the wall of the base 10 and are connected to a suitable electro-magnetically operated valve, not shown, which controls the discharge of moisture from the humidifier into the compartment in which the hygrostat is installed.

Secured to the yoke-shaped end portion 12 of the contact arm, by the screw 13, is a bracket 24 carrying an adjustable screw 25 having a central bore within which is rotatably positioned a member 26 having a head 27 at its lower end, engaging a recess 28 formed in the head of the screw 25, and having a hook 29 at its upper end. A spring 30 has one of its ends connected to the hook 29, at the upper end of the rotatable member 26. The other end of the spring 30 is connected to a hook 31 secured to a metal bar 32, having its lower end attached to the base 10, and having its upper, free end secured to an arm 33 pivotally mounted upon the base 10. The bar 32 is made of a metal having a co-efficient of expansion, differing from that of the metal of which the base 10 is made, whereby the bar 32 and base 10 will constitute compensating means for preventing the instrument from being affected by any changes in temperature within the compartment in which the instrument is installed. In practice it has been found that the desired result will be obtained if the base 10 is formed of brass and the bar 32 of steel.

The arm 33 is provided, adjacent its free end, with an eye 34 through which pass a plurality of strands 35 of a substance, such as human hair, adapted to vary in length as the humidity of the air, to which it is exposed, varies. As is well known, human hair increases in length as it becomes moist, and decreases in length as it becomes dry. The free ends of the strands 35 are secured, by a clamp 36, to one end of a lever 37 pivotally supported upon the pivot-pin 11, intermediate the arms of the yoke-shaped end portion 12 of the contact arm. The other end of the lever 37 engages the head of a screw 38, the shank of which passes through a slot 39 in the lever 37 and is adjustably supported by the bracket 24.

In practice, the screws 25 and 38 are so adjusted that the tension of the spring 30 will be balanced by the tension of the strands of hair 35, thereby maintaining the free end of the bar 14 of the contact arm intermediate the contacts 15 and 16, when the air within the compartment in which the instrument is installed is of the desired humidity. Should the humidity in the compartment decrease, the strands of hair 35 will shorten, thereby moving the contact arm to cause the free end of the bar 14 to engage the contact 16. This movement of the contact arm closes the circuit between the conductors 21 and 22 whereupon the electro-magnetic valve is opened to permit moisture to pass into the compartment.

As the humidity of the air within the compartment increases, owing to the introduction of the moisture therein, the strands 35 will gradually lengthen and the spring 30 will thereupon actuate the contact arm to move the free end of the rod 14 out of engagement with the contact 16. Upon the humidity in the air increasing beyond the predetermined desired value, the free end of the arm 14 will be moved, by the spring 30, into engagement with the contact 15, thereby closing the electric circuit through the conductors 20 and 21, whereupon the electro-magnetic valve will be closed to prevent the passage of moisture into the compartment. The contact arm will be returned to its normal position when the humidity of the air falls to the desired value, and will remain in such normal position until the degree of humidity falls sufficiently to cause the strands 35 to again contract and move the contact arm to cause the free end of the arm 14 to engage the contact 16, whereupon the operation above-described will be repeated.

As the spring 30 and the loop formed by the strands of hair 35 have their ends operatively connected, respectively, to the steel bar 32 and to the brass base 10, which constitute the temperature compensating means, it will be understood that the operation of the instrument will in no way be affected by changes in temperature within the compartment in which it is installed.

Having thus described my said invention what I claim and desire to secure by Letters Patent is:—

1. A hygrostat comprising a movable member normally occupying a neutral or inoperative position, means responsive to variations of moisture in the air to move said member in one direction, means acting independently of the moisture for moving said member in the opposite direction, and means for adjusting each of said means to hold said member in its neutral position for any desired degree of moisture in the air, substantially as specified.

2. A hygrostat comprising a support, a movable member mounted thereon and adapted to be moved in a plurality of directions, an expansible and contractible bar having one of its ends secured to said support, and means operatively connected to said movable member and to said bar for moving said movable member in either direction, substantially as specified.

3. A hygrostat comprising a support, a movable member mounted thereon, an expansible and contractible bar having one of its ends secured to said support, means operatively connected to said movable member and to said bar for moving said movable member in one direction, and means operatively connected to said movable member and to said bar for moving said movable member in the opposite direction, substantially as specified.

4. A hygrostat comprising a support, a movable member mounted thereon, an expansible and contractible bar having one of its ends secured to said support, means operatively connected to said movable member and to said bar and responsive to variations of moisture in the air for moving said movable member in one direction, and means operatively connected to said movable member and to said bar and acting independently of the moisture in the air for moving said movable member in the opposite direction, substantially as specified.

5. A hygrostat comprising a support, a movable member mounted thereon, an expansible and contractible bar having one of its ends secured to said support, hygroscopic means operatively connected to said movable member and to said bar for moving said movable member in one direction, and elastic means operatively connected to said movable member and to said bar for moving said movable member in the opposite direction, substantially as specified.

6. A hygrostat comprising a support, a movable member mounted thereon, an expansible and contractible bar having one of its ends secured to said support, hygroscopic means operatively connected to said movable member and to said bar for moving said movable member in one direction, and a spring operatively connected to said movable member and to said bar for moving said movable member in the opposite direction, substantially as specified.

7. A hygrostat comprising a support, a movable member mounted thereon, an arm pivotally secured to said support, an expansible and contractible bar having one of its ends secured to said support and its other end secured to said arm, means secured to said arm and to said movable member to move the latter in one direction, and means secured to said bar and to said movable member to move the latter in the opposite direction, substantially as specified.

8. A hygrostat comprising a support, a movable member mounted thereon, an arm pivotally secured to said support, an expansible and contractible bar having one of its ends secured to said support and its other end secured to said arm intermediate the ends thereof, means secured to the free end of said arm and to said movable member to move the latter in one direction, and means secured to said bar and to said movable member to move the latter in the opposite direction, substantially as specified.

9. A hygrostat comprising an expansible and contractible support, a movable member mounted thereon, an expansible and contractible bar having one of its ends secured to said support, said bar having a coefficient of expansion differing from that of said support, and means operatively connected to said movable member and to said bar to control the movement of said member, subtantially as specified.

10. A hygrostat comprising an expansible and contractible support, a movable member mounted thereon, an expansible and contractible bar having one of its ends secured to said support, means operatively connected to said bar and to said member and responsive to variations of moisture in the air for moving said member in one direction, and means operatively connected to said bar and to said member and acting independently of the moisture in the air for moving said member in the opposite direction, substantially as specified.

11. A hygrostat comprising a metal support, a movable member mounted thereon, an arm pivotally secured to said support, a metal bar having one of its ends secured to said support and its other end secured to said arm, said metal bar having a coefficient of expansion different from that of said metal support, means secured to the free end of said arm and to said movable member to move the latter in one direction, and means secured to said bar and to said movable member to move the latter in the opposite direction, substantially as specified.

Signed at the city of Buffalo, Erie county, in the State of New York, this 14th day of March, one thousand nine hundred and eighteen.

LEWIS W. EGGLESTON.

Witnesses:
FRANK B. HOWELL,
W. SCHOENBERNER.